Oct. 9, 1928.  1,686,841
A. BRIESE ET AL
MACHINE FOR COUNTERSINKING PIPE COUPLINGS
Filed March 18, 1926  2 Sheets-Sheet 1
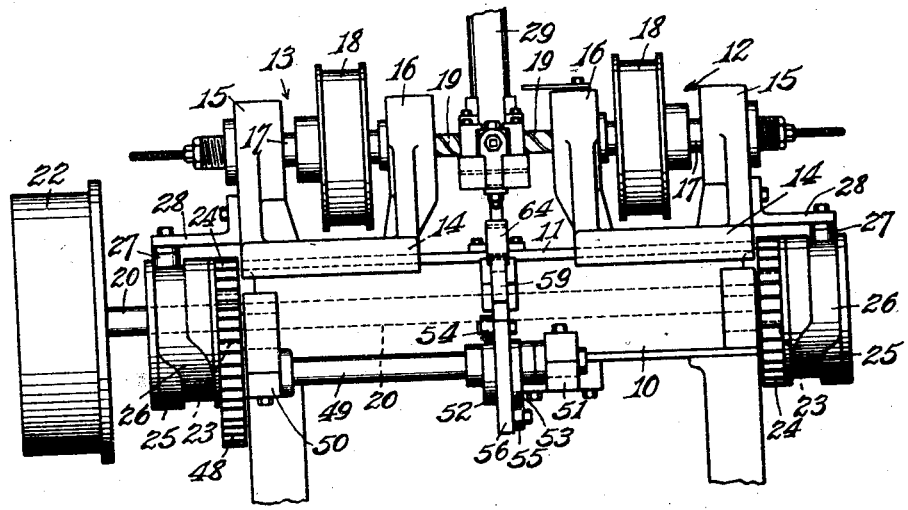
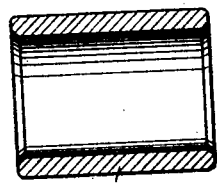
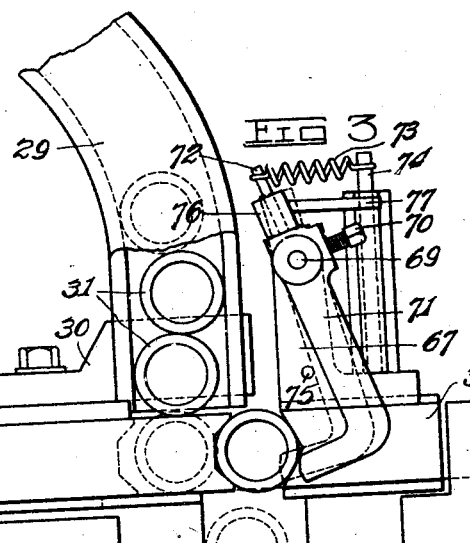
INVENTORS
Alfred Briese and
Russell Callow.
BY
ATTORNEY Oct. 9, 1928.　　　　　　　　　　　　　　　1,686,841
A. BRIESE ET AL
MACHINE FOR COUNTERSINKING PIPE COUPLINGS
Filed March 18, 1926　　　2 Sheets-Sheet 2
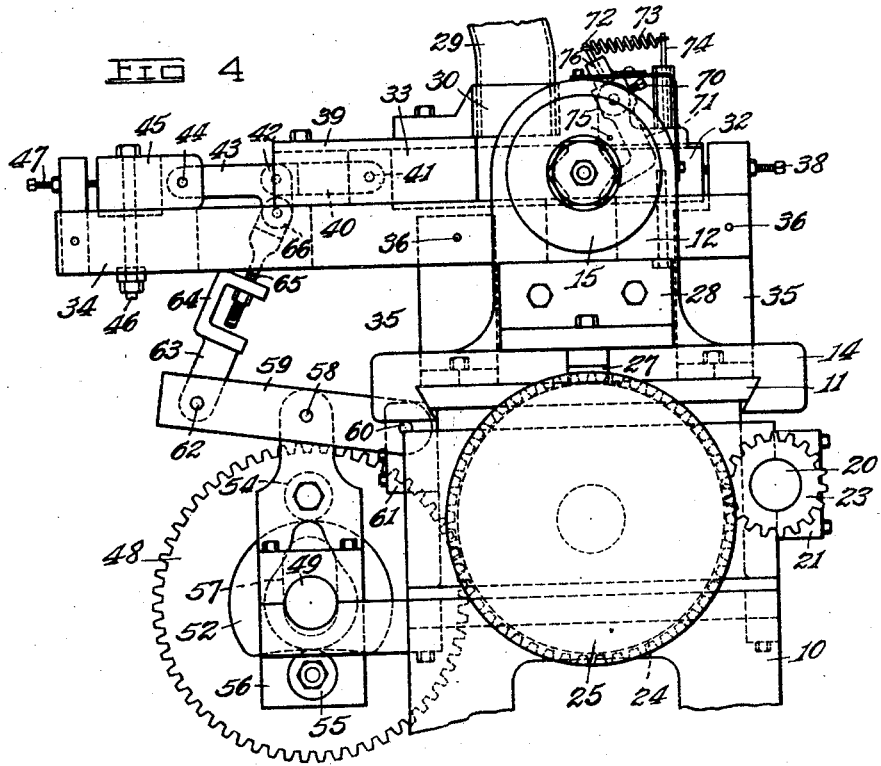
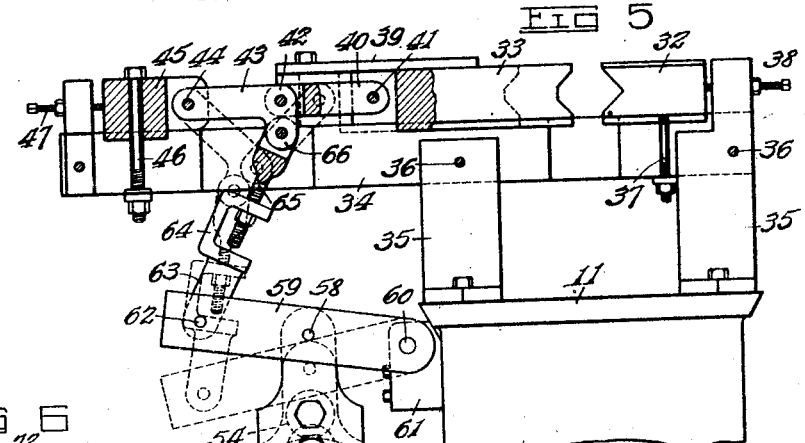
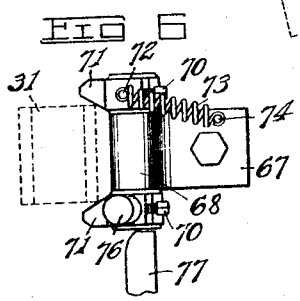
INVENTORS
Alfred Briese 2nd
Russell Callow
BY
ATTORNEY Patented Oct. 9, 1928.

1,686,841

UNITED STATES PATENT OFFICE.

ALFRED BRIESE, OF WHEELING, AND RUSSELL CALLOW, OF BOGGS RUN, WEST VIRGINIA.

MACHINE FOR COUNTERSINKING PIPE COUPLINGS.

Application filed March 18, 1926. Serial No. 95,629.

This invention relates to an automatic countersinking machine for pipe couplings and similar articles and has for its main object the provision of such a machine that shall operate with a high output. The invention also contemplates certain features of construction and arrangement of parts which shall make for simplicity in construction and efficiency in operation.

The invention comprises generally a machine having a holder for work pieces such as pipe couplings which are usually countersunk before being tapped, cutter heads that carry cutters for countersinking movable toward and away from the holder, a chute or stacker that delivers the work pieces to the holder, and devices for moving the cutter heads and for actuating the work holder to secure and release the work pieces in timed relation to the movement of the cutter heads. The machine is designed to be continuous and automatic in operation so that work pieces are delivered to the machine in sequence, are countersunk, and are then expelled from the machine in an automatic and continuous manner.

A feature of the invention is a device for centering each work piece in the holder so that where each end of the work piece is countersunk simultaneously the countersink will be equal in both ends.

Another feature is the provision of simple means for moving the cutter heads and for actuating the holder for the work pieces.

Further features of construction and operation will hereinafter appear. For a complete understanding of the invention reference is to be had to the following description in connection with the accompanying drawings, in which—

Figure 1 is a front view in elevation of the machine;

Figure 2 is a longitudinal sectional view of the work piece, such as a pipe coupling with the ends countersunk;

Figure 3 is a fragmentary view with parts removed and broken away, showing the work piece chute, the holder or gripping device for the work pieces, and the device for centering the work piece.

Figure 4 is a side view in elevation of the machine;

Figure 5 is a fragmentary view, partly in section and with parts removed, showing the holder or gripping device and the actuating mechanism therefore; and—

Figure 6 is a top view of the centering device.

Referring to the drawings in detail, the reference character 10 designates the machine frame having the upper bed 11 with dovetail sides, as shown more clearly by Fig. 4. Slidably mounted on the bed 11 are cutter heads, designated generally by the reference characters 12 and 13. Each of these cutter heads comprises a dovetail base 14, and upstanding bearings 15 and 16. A shaft 17 and a pulley 18 are located between each pair of bearings 15 and 16, the shaft 17 being journaled in these bearings and rotated by the pulley 18 carried by the shaft. A twist drill cutter is secured to rotate with the shaft, the securing means being any suitable device (not shown). The cutter is designated by the numeral 19 and it will be understood that any suitable cutter may be employed.

The cutter heads 12 and 13 are moved toward each other for the countersinking operation and away from each other after this operation is completed. The means for moving these cutter heads comprises a shaft 20 journaled in the frame 10 having bearings 21, as shown more clearly by Fig. 4. The shaft has secured thereto at one end thereof a driving pulley 22. Secured to the shaft 20 near each end thereof is a pinion 23, shown in dotted lines in Fig. 1 and in full lines in Fig. 4. These pinions 23 mesh with and drive gears 24 carried by stub shafts mounted in bearings in the ends of the frame. Fastened to these gears 24 in any suitable manner so as to rotate therewith are cam members 25 having the continuous cam grooves 26. Rollers 27 are fitted to the cam grooves 26 and are secured to brackets 28 which are connected to the outer bearings 15 of the cutter heads 12 and 13. It will be readily understood that as the cams 25 are rotated by the gears 24, the rollers 27 will be moved thereby for a portion of the rotation of the cams to thereby move the cutter heads. It will be noted that the cams have their grooves homologously arranged so that the cutter heads are moved the same distance toward each other and the same distance away from each other. It will be understood that the distance through which the cutter head is moved is small, especially in proportion to the length of belt that operates each of the pulleys 18, so that it is not necessary to provide for movement of the pulleys 18 longitudinally of the shafts 17.

A chute or stacker 29 secured to a bracket 30 is arranged to deliver work pieces, such as pipe couplings 31, to a holder or gripping device comprising, preferably, a stationary part 32 and a movable part 33, as shown by Fig. 3. This holder is carried by plates 34 which are secured to uprights 35 by pins or rods 36. The upright supports 35 are bolted to the bed 11 of the machine frame 10. The stationary part or jaw 32 of the holder is securely held in place on the plates 34 by the bolt 37 and may be adjusted by the aid of the bolt 38. The movable jaw 33 is adapted to slide on the plates 34 and is held in place by the upper guide plate 39. It will be noted that the holder is positioned between the cutter heads 12 and 13, and that the movable jaw 33 is adapted for movement transversely of the machine bed 11 and the cutter heads. The movable jaw 33 is connected by a link 40 pivoted thereto, as at 41, to one end 42 of one part of a bell-crank lever 43, the other end of the same part of this lever being pivotally connected at 44 to a block 45. The block 45 is fixedly secured to the plates 34 by the bolt 46, but may be moved to adjusted position by the aid of the bolt 47. This linkage forms part of a mechanism for actuating the holder, more particularly the movable jaw 33, as will hereinafter appear.

Referring to Figs. 1 and 4 of the drawings, the reference character 48 designates a gear wheel that meshes with one of the gears 24 and is thereby actuated to rotate a shaft 49 that is journaled in bearings 50 and 51 associated with the machine frame 10. Secured to the shaft 49 are two cams 52 and 53 which bear on rollers 54 and 55, respectively, of a follower member 56 which is slotted, as at 57, for movement transversely of the shaft 49. The cam 52 bears on the roller 54 to raise the follower 56, and the cam 53 bears on the roller 55 to lower the follower, at the proper times. In both cases, the action of the cams is positive. The upper end of the follower 56 is pivotally connected, as at 58, intermediate the length of a link 59, one end of which is pivotally connected to a lug 61 at 60. The other end of the link 59 is pivotally attached at 62 to one end of an adjustable link 64 comprising the relatively adjustable parts 63 and 65, the latter being attached to the part 66 of the bell-crank lever 43.

A feature of the invention is a centering device which will now be explained. Referring more particularly to Figs. 3, 4 and 6, a standard 67 has at the upper part thereof a bearing 68 for a short shaft 69 at each end on which is secured, as by a set screw 70, a finger 71. To a lug 72 on one of the fingers 71 is secured one end of a coil spring 73 the other end of which is fastened to an upstanding rod 74. The spring 73 urges the fingers toward the pin 75 fixed to the bracket 67 and this pin 75 acts as a stop. A roller 76 is mounted at the top of one of the fingers 71. This roller is struck by a bar 77 as the cutter heads advance toward each other to move the fingers against the tension of the spring 73.

The operation of the machine will be readily understood. The cutter heads are advanced toward each other when the shaft 20 is rotated to thereby rotate the pinions 23 which mesh with the gears 24 and rotate the latter. The gears 24 actuate the cams 25 which, at a certain portion of the rotation thereof, move the cutter heads 12 and 13 toward each other. Just before the cutters are moved to operative position, the jaw 33 of the holder or gripping device is moved toward the stationary jaw 32 through the linkages actuated by the cam follower 56 which is raised by the cam 52 that is rotated by the shaft 49 driven by the gear 48 that is rotated by a gear 24 meshing therewith. A work piece 31, which has dropped from the delivery chute 29, as shown in dotted lines in Fig. 3, is in position to be pushed by the jaw 33 into engagement between the latter and the jaw 32. As this work piece is being gripped by the holder, the fingers 71 act to center it as clearly shown by Fig. 6, so that as the cutters subsequently operate both ends of the work piece will have equal countersinks. With the jaws of the holder gripping the work piece, the cutters advance to position for the cutting operation, but just before this occurs, a bar 77 strikes the roller 76 of the centering device and moves the fingers thereof out of the path of the cutters.

After the cutters have performed their operation, they are withdrawn by the action of the cams 25, and at about the same time, the cam 53 lowers the follower 56 which actuates the linkages connected to the jaw 33 to move the latter away from the jaw 32 to thereby release the work piece just operated on by the cutters. As the jaw 33 is withdrawn, the work piece falls through an opening in the plates 78 and is caught in a suitable receptacle (not shown). The jaw 33 is withdrawn sufficiently to permit another work piece to fall into position to be engaged by the jaw as it returns for the next operation. It will be understood that the machine operates with great rapidity and that the jaw 33 moves fast enough so that as the work piece is pushed over the opening 78, it is caught between the jaws of the holder before it can fall any appreciable amount. It will be noted that by the arrangement of the linkage shown, particularly the bell-crank lever and the links connected thereto, a comparatively small movement of the jaw 33 affords an increased gripping action by the jaws of the holder.

It will be understood that certain details of construction and the arrangement and combination of parts may be altered; that the machine may be used in other relations than that herein set forth, and that certain parts may be omitted, without departing from the invention as set forth in the appended claims.

What is claimed is—

1. In a machine of the kind described, movable cutter heads, a holder for work pieces, means for moving said cutter heads toward and away from said holder, means for actuating said holder in timed relation to the movement of the cutter heads, pivoted centering members for positioning a work piece in the holder, and means for withdrawing said positioning members from operative position in timed relation to the movements of the cutter heads.

2. In a machine of the kind described, movable cutter heads, a holder for work pieces positioned between said cutter heads and comprising a stationary part and a movable part, means for moving said cutter heads simultaneously toward and away from said holder, an intermittently operated centering device associated with said holder, said device comprising pivoted members adapted to be actuated in unison relative to the opposite ends of the work piece, means for actuating said members in timed relation to the movements of the cutter heads and means for moving said movable part of the holder toward and away from its stationary part.

3. In a machine of the kind described, a movable holder member, a bell-crank lever connected to said member, an adjustable link connected to said bell-crank, and cam means including a slotted follower and rollers borne by said follower for actuating said link to move said holder member in opposite directions.

4. In a machine of the kind described, movable cutter heads, a holder having a stationary part and a movable part, a centering device associated with said stationary holder part, means for moving said cutter heads and said movable holder member, and means associated with one of said cutter heads for withdrawing said centering device from operative position in timed relation to the movement of the cutter heads.

5. In a machine of the kind described, a frame, cutter heads mounted for movement on said frame, a work piece delivery chute mounted on the frame, a holder having a movable member mounted for sliding movement under said chute, said frame having an opening under the holder and offset from the chute, means for moving said cutter heads, and means for moving said holder member to secure a work piece from the delivery chute in the holder while the cutter heads are in cutting position and for releasing the work piece from the holder to permit the same to drop through said opening when the cutter heads are moved to inoperative position, the last mentioned cams including spring advanced fingers for engaging opposite ends of the work piece, and a member operable to retract said fingers.

In testimony whereof we affix our signatures.

ALFRED BRIESE.
RUSSELL CALLOW.